United States Patent [19]

Geyer et al.

[11] Patent Number: 4,856,029
[45] Date of Patent: Aug. 8, 1989

[54] TECHNIQUE FOR PROCESSING A DIGITAL SIGNAL HAVING ZERO OVERHEAD SYNC

[75] Inventors: Daniel J. Geyer, Leucadia; Ward M. Calaway, Sierra Madre, both of Calif.

[73] Assignee: Eastman Kodak Company, Rochester, N.Y.

[21] Appl. No.: 255,689

[22] Filed: Oct. 11, 1988

[51] Int. Cl.⁴ .............................................. H04L 7/02
[52] U.S. Cl. .................................... 375/110; 307/511; 328/63
[58] Field of Search ............... 375/106, 110, 108, 111; 360/26, 76; 328/63, 72; 371/42, 46; 358/148, 158; 307/510, 511

[56] References Cited

U.S. PATENT DOCUMENTS

| | | | |
|---|---|---|---|
| 3,842,399 | 10/1974 | Knever et al. | 375/110 |
| 3,961,138 | 6/1976 | Fellinger | 375/111 |
| 3,969,582 | 7/1976 | Van Duvren et al. | 375/111 |
| 4,088,831 | 5/1978 | Butcher et al. | 178/69.1 |
| 4,404,676 | 9/1983 | DeBenedictis | 371/47 |
| 4,414,587 | 11/1983 | Weaver et al. | 360/76 |
| 4,493,093 | 1/1985 | Veillard | 375/110 |
| 4,577,318 | 3/1986 | Whitacre et al. | 371/1 |
| 4,672,447 | 6/1987 | Morning | 375/111 |
| 4,737,971 | 4/1988 | Lanzafame et al. | 375/118 |

OTHER PUBLICATIONS

The Art of Electronics, Horowitz and Hell, Cambridge University Press, Cambridge 1980, p. 477.

Primary Examiner—Benedict V. Safourek
Assistant Examiner—Stephen Chin
Attorney, Agent, or Firm—William F. Noval

[57] ABSTRACT

Apparatus for effecting the technique includes a subtraction circuit for producing a difference signal by subtracting successive words of the serial bit stream forming the digital signal. A comparator circuit compares the difference signal to a predetermined maximum slew rate limit signals. If the difference signal is greater than the maximum limit signal, then subtration and comparison is repeated, after shifting the successive words of the digital signal by one bit. This process is repeated until, when the difference no longer exceeds S, synchronization is assumed.

4 Claims, 3 Drawing Sheets

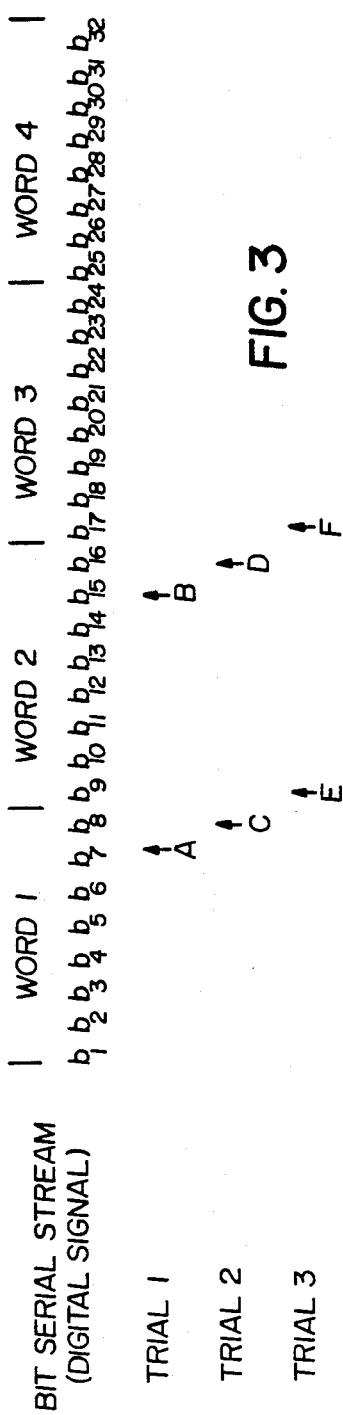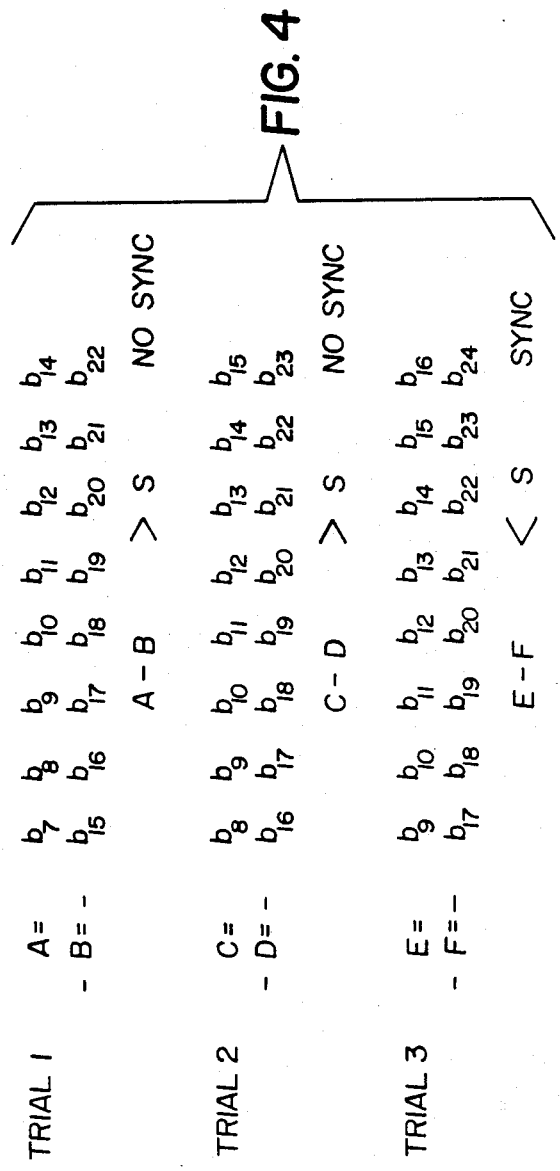

TECHNIQUE FOR PROCESSING A DIGITAL SIGNAL HAVING ZERO OVERHEAD SYNC

BACKGROUND OF THE INVENTION

In general, this invention relates to digital signal processing. More particularly, this invention relates to a technique for identifying the successive words of a serial bit stream digital signal, where the slew rate (rate of change) of successive words within the signal are limited to a predetermined maximum limit so that separate synchronization indicia are not required.

A digital signal generally comprises a serial stream of bits formed from successive words, each word having the same number of bits. In processing the digital signal, it is necessary to make certain that each word is correctly identified, so that the information represented by the word may be recovered and properly utilized. If the sequence of words is not correctly identified, then, incorrect operation of the equipment utilizing the digital signal will result.

Several techniques have been proposed to insure proper identification of successive words in a serial bit stream digital signal. In one such technique, each word in a serial bit stream is separated from its adjacent words by means of a specially coded sequence of bits (e.g., "start" and "stop" bits) constituting sync for the serial bit stream. (See: *The Art of Electronics,* Horowitz and Hill, Cambridge University Press, Cambridge 1980, page 477.) Typically, about 10% or more of the bits in a serial bit stream containing sync bits are dedicated to the definition of sync. Such a technique is disadvantageous because it increases the complexity of circuitry for identifying successive words of a digital signal and because it results in a reduced utilization of available channel capacity.

Another technique is disclosed in U.S. Pat. No. 4,008,831, issued May 9, 1978, patentee Butcher et al. As disclosed, the characteristic of one of the bits of a byte is modified to indicate the start or end of the byte. A pulse code modulated signal comprising a series of digital pulses is modified so that the position of one of the pulses in a byte serves as synchronizing indicia for the byte. An analogous technique disclosed in U.S. Pat. No. 4,404,676, issued Sept. 13, 1983, patentee DeBenedictis, utilizes a data dependent code word to mark a boundary of a multibyte block of data. The code word also effects error correction of the data block. The techniques disclosed in both of these patents are disadvantageous in requiring complex processing circuitry and in resulting in reduced data rate and/or data capacity Another relevant technique is disclosed in commonly assigned U.S. Pat. No. 4,493,092, issued Jan. 8, 1985, patentee Veillard. As disclosed, the start and end of words within a bit stream, without the provision of special sync-defining bits, are determined by monitoring the number of times that corresponding bits from successive words switch their states. Like order bits of successive words are compared and counts stored of bit changes. A sync pulse is produced when a predetermined threshold count is reached. Although the disclosed technique may be useful for its intended purpose, the circuit required is expensive and complex in the use of several storage registers and logic components.

SUMMARY OF THE INVENTION

According to the present invention, there is provided a technique for obviating the disadvantages of the digital signal synchronization techniques enumerated above. According to an aspect of the present invention, an analog signal, which is slew rate limited, is converted to a digital signal having no separate indicia for delineating words of the serial bit stream. According to the invention, successive words of the digital signal are subtracted to produce a difference signal which is compared to a maximum slew rate signal. If the difference signal is greater than the maximum signal, the two successive words are shifted by one bit and subtracted. The difference signal produced is again compared to the maximum slew rate signal. This process is repeated until, when the difference no longer exceeds S, synchronization may be assumed.

BRIEF DESCRIPTION OF THE DRAWINGS

FIGS. 3 and 4 are diagrams useful in explaining the operation of the apparatus of FIG. 2.

DETAILED DESCRIPTION OF THE PREFERRED EMBODIMENT

The present invention relates to the processing of a bit stream constituting a sequence of digitized analog signals which may be slew rate limited. Slew rate limiting restricts the rate at which the analog signal is allowed to change signal level. The analog signal may be inherently slew rate limited or may be limited before being digitized. According to the technique of the invention, a slew rate limited analog signal may be converted to a serial bit stream without including separate indicia for identifying words within the serial bit stream. Thus, the data rate and data capacity of the digital signal may be optimized and the circuitry for processing the digital signal may be minimized.

Figure 1:
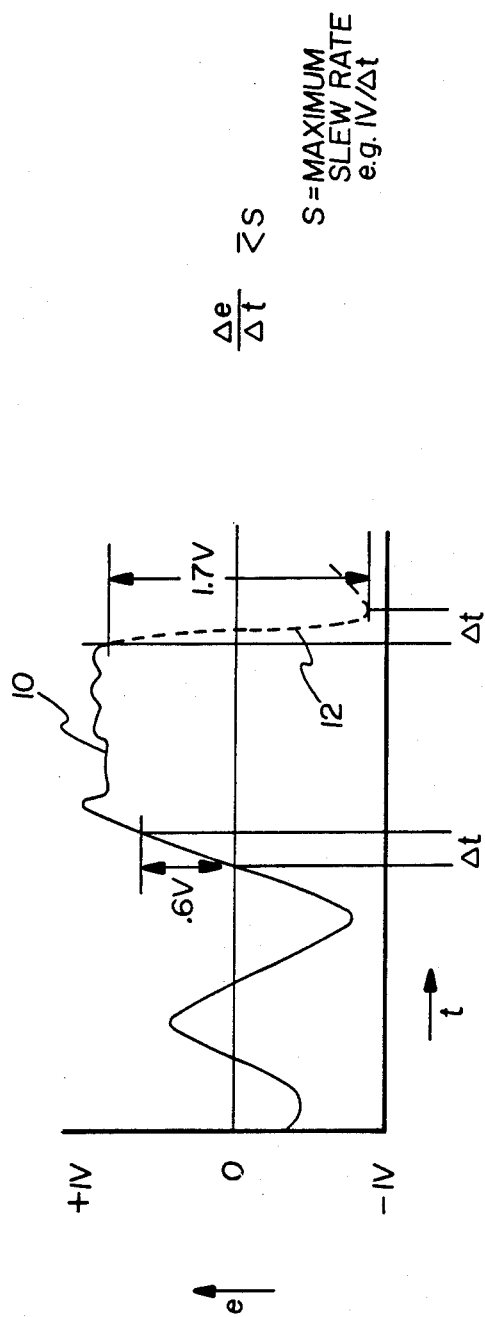
FIG. 1 is a voltage versus time diagram useful in explaining the present invention.

Referring to FIG. 1, there is shown a diagram of an analog voltage signal plotted against time. As depicted, the solid line analog signal 10 is limited so that the rate of change of signal level against time is limited (for example to less than 1 volt/$\Delta t$). The dashed line analog signal 12 has a rate of change of signal which is greater than one volt/$\Delta t$ (e.g., 1.7 v/$\Delta t$). Such a signal should be processed by an aliasing filter or a slew rate limiting circuit to limit the rate of change to less than the slew rate S.

Figure 2:
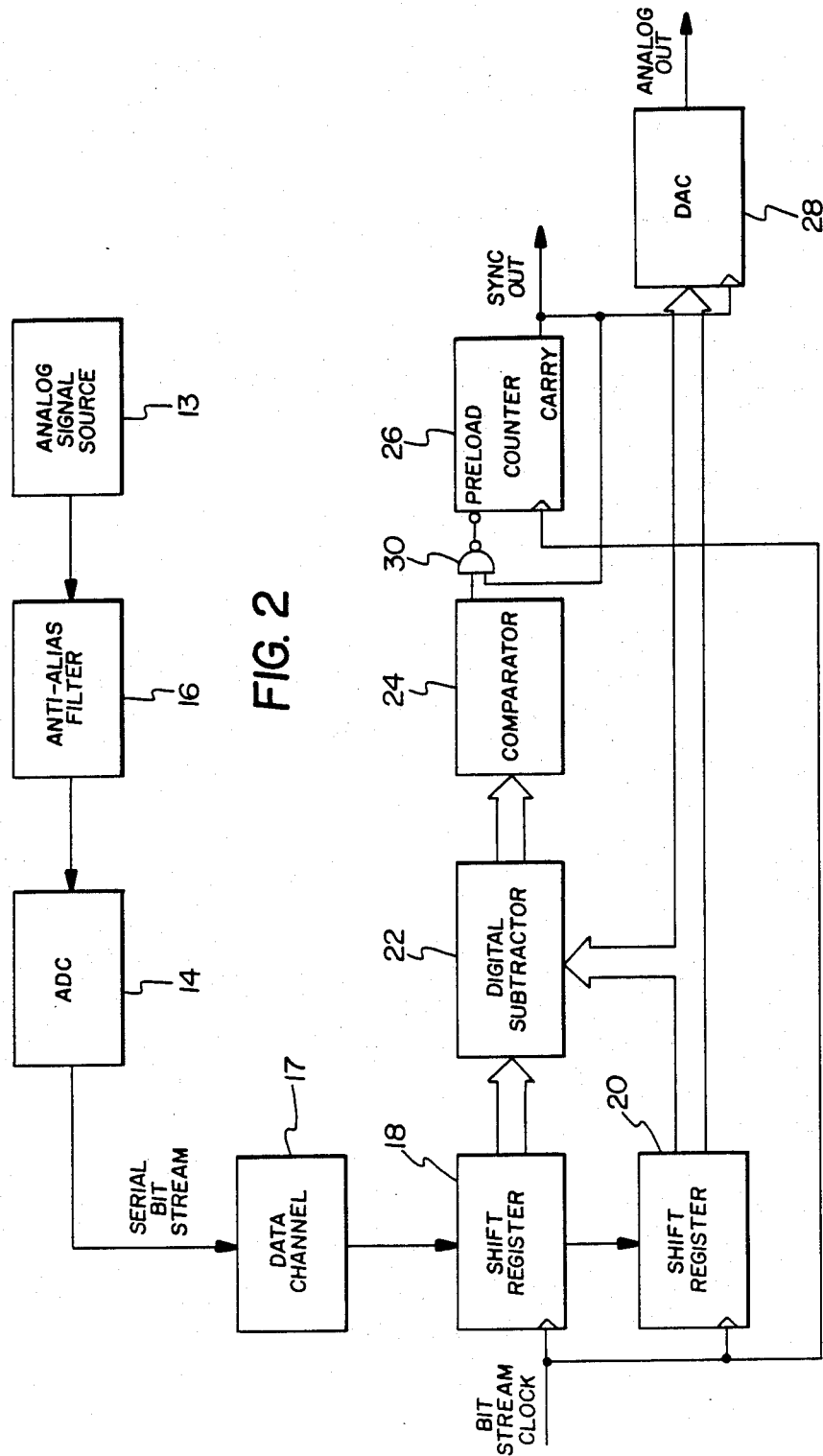
FIG. 2 is a block schematic diagram of apparatus for effecting the technique of the present invention.

In referring now to FIG. 2, there will be described a preferred embodiment of apparatus according to the present invention. As shown, an analog signal source 13 provides an analog signal to analog-to-digital converter (ADC) 14. If the analog signal is not slew rate limited, it is processed by anti-aliasing filter 16. If the analog signal is inherently slew rate limited, the analog signal may be directly provided to ADC 14. Converter 14 produces a digital signal constituting a serial bit stream which is provided to data channel 17 (such as a recorder, transmitter, etc.). The stream is formed from consecutive words, wherein each word is made up of the same number of bits (for example, 8 bits per word).

FIG. 3 depicts a serial bit stream constituting a digital conversion of a segment of the analog signal shown in FIG. 1. Each sample of the analog signal for a time period Δt has been converted by ADC 14 into a digital signal constituting an 8 bit word. Because the digital signal is slew rate limited, no synchronizing bits are inserted between successive words, so that both the data rate and data capacity of the digital signal are optimized.

The digital signal of FIG. 3 constitutes a serial bit stream of 32 bits $b_1$–$b_{32}$, constituting four successive words. These words represent 4 successive samples of analog signal 10 taken over four successive periods Δt. According to the present invention, since no separate synchronizing indicia or synchronizing bits are provided to identify successive words of the digital signal, a reiterative technique correctly identifies and synchronizes successive words of the serial bit stream. The apparatus of FIG. 2 effects this technique and includes shift registers 18 and 20, digital subtraction circuit 22, comparator circuit 24, counter 26, digital-to-analog converter (DAC) 28 and gate 30. The output from comparator 24 to gate 30 is true if the difference is greater than S and gate 30 advances counter 26 to sync on the next least significant bit.

Referring to FIGS. 3 and 4, the identification and synchronization of successive words of the digital signal of FIG. 3 will be described with reference to the apparatus of FIG. 2. Since the bit stream received from data channel 17 does not have any synchronizing bits to identify which 8 bits within the stream constitutes a data word, two successive 8 bit words are randomly stored in 8 bit-shift registers 18 and 20. In the example given, words constituting $b_7$–$b_{14}$ and $b_{15}$–$b_{22}$ are loaded into registers 18 and 20. Subtraction circuit 22 produces a difference signal by subtracting the words stored in registers 18 and 20. This difference signal is then compared by comparator circuit 24 to the maximum slew rate limit value S.

As illustrated in FIG. 4, at trial 1, the word starting with the bit indicated by arrow A of FIG. 3 and the word starting with the bit indicated by arrow B of FIG. 3 are subtracted to produce a difference signal. The difference between these words is determined by circuit 24 to be greater than S. There is, therefore, no synchronization and correct data words have not been identified. Consequently, the successive words are shifted by one bit and stored in shift registers 18 and 20. Then, the word (arrow D) including bits $b_{16}$–$b_{23}$ is subtracted from the word (arrow C) including bits $b_8$–$b_{15}$.

At trial 2 in FIG. 4, the difference signal produced by the subtraction of the latter two words results in a difference signal which is also greater than the maximum slew rate signal S. Since synchronization is not effected (No SYNC), the process is repeated. Thus, at trial 3, the words starting with the bits indicated by solid arrow E bits $b_9$–$b_{16}$) and by the solid arrow F (bits $b_{17}$–$b_{24}$) are subtracted by circuit 22 and the difference signal compared in circuit 24 with the maximum slew rate signal S. Since the difference signal is not greater than the slew rate signal, a sync signal is produced by counter 26. Thus, the words starting at bits $b_9$ and $b_{17}$ are identified as correct words and synchronization of the entire bit stream is effected. DAC 28 then produces an analog signal which is a true reconstruction of the signal inputted to ADC 14.

Although a specific embodiment of the present invention has been described above, it will be understood that other embodiments may be effected within the scope of the present invention. Thus, shift registers 18 and 20 of FIG. 3 may be replaced with random access memory.

The subtraction and comparator circuits 22 and 24 may be replaced with a microprocessor which is programmed to perform the subtraction and comparison steps on data which has been read into and read out of the random access memory.

The invention has been described in detail with particular reference to preferred embodiments thereof but it will be understood that variations and modifications can be effected within the spirit and scope of the invention.

What is claimed is:

1. Digital signal processing apparatus comprising:
    means for providing a serial bit stream digital signal constituted by a succession of words which are each comprised of the same number of bits per word, wherein said digital signal is characterized such that there is no synchronizing bits between successive words to delineate the start and end of each of said words, and such that the change in the value between successive words is not greater than a maximum slew rate limit S;
    memory means for storing first and second successive words of said digital signal;
    means for subtracting said first and second words to produce a difference signal;
    means for comparing said difference signal with said maximum slew rate signal S and for producing a sync signal when said difference signal is not greater than S; and
    means for shifting the successive words stored in said memory means by one bit when said difference signal is greater than S and for causing said subtracting means and said comparing means to subtract and compare said bit shifted successive words, until, when the difference signal no longer exceeds S, sync is assumed.

2. The apparatus of claim 1 wherein said digital signal providing means includes a source of an analog signal which has a slew rate which is not greater than a maximum value S and further including means for converting said analog signal into said digital signal.

3. The apparatus of claim 2 wherein said analog signal source includes a slew rate limiting circuit for limiting the slew rate of an analog signal to said maximum slew rate limit S.

4. A method for processing a serial bit stream digital signal constituted by a succession of words, each of which is comprised of the same number of bits per word, wherein said digital signal is characterized such that there is no synchronizing bits between successive words to delineate the start and end of said words, and such that the slew rate of change in value between successive words of said digital signal is not greater than a maximum slew rate S, the method comprising the steps of:
    storing first and second successive words of said digital signal in memory;
    subtracting said first and second words to produce a difference signal;
    comparing said difference signal to said maximum slew rate signal S and producing a sync signal only when said difference signal is not greater than S; and
    repeating said storing, subtracting and comparing steps on two successive words which have been shifted by one bit until, when the difference signal no longer exceeds, S, sync is assumed.

* * * * *

UNITED STATES PATENT AND TRADEMARK OFFICE
CERTIFICATE OF CORRECTION

PATENT NO. : 4,856,029
DATED : August 8, 1989
INVENTOR(S) : Geyer et al.

It is certified that error appears in the above-identified patent and that said Letters Patent is hereby corrected as shown below:

On the title page, item [57] ABSTRACT, add the following two sentences to the beginning of the ABSTRACT:

--If an analog signal has a slew rate which is limited, for instance by an anti-aliasing filter, the analog signal may be converted into a serial bit stream digital signal which does not include any separate sync signal for delineating the boundaries of digital words forming the digital signal. Disclosed is a technique for processing such a digital signal in order to delineate and synchronize successive words for further processing.-- and ABSTRACT
line 7

"subtration" should be
--subtraction--

Signed and Sealed this

Twenty-fourth Day of July, 1990

Attest:

HARRY F. MANBECK, JR.

*Attesting Officer*    *Commissioner of Patents and Trademarks*